(12) United States Patent
Chang et al.

(10) Patent No.: US 8,117,228 B2
(45) Date of Patent: Feb. 14, 2012

(54) HEAD-TO-HEAD COMPARISONS

(75) Inventors: Kenneth N. Chang, San Jose, CA (US); David A. Koski, Cupertino, CA (US); Pedraum R. Pardehpoosh, Palo Alto, CA (US); Ralph E. Zazula, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/153,303

(22) Filed: Jun. 3, 2011

(65) Prior Publication Data
US 2011/0238699 A1 Sep. 29, 2011

Related U.S. Application Data

(63) Continuation of application No. 11/529,871, filed on Sep. 29, 2006, now Pat. No. 7,979,462.

(51) Int. Cl.
*G06F 7/00* (2006.01)
*G06F 17/30* (2006.01)

(52) U.S. Cl. ..................... 707/780; 705/26.64; 705/26.7

(58) Field of Classification Search ................... 707/780
See application file for complete search history.

(56) References Cited

U.S. PATENT DOCUMENTS

| | | | | |
|---|---|---|---|---|
| 2002/0169676 A1* | 11/2002 | Floyd | ............................. | 705/26 |
| 2006/0167757 A1* | 7/2006 | Holden et al. | ................... | 705/26 |
| 2007/0143281 A1* | 6/2007 | Smirin et al. | ..................... | 707/5 |

* cited by examiner

*Primary Examiner* — John Cottingham
*Assistant Examiner* — Nicholas Allen
(74) *Attorney, Agent, or Firm* — Van Pelt, Yi & James LLP

(57) ABSTRACT

Providing a comparison of a set of similar items includes: receiving from a first member of an online community a selection of a stored prior comparison created by another online community member of a set of similar items; providing to the first member a template for the comparison, the template being at least partially pre-populated using data from the stored prior comparison created by the other online community member; and receiving from the first member a submission of the comparison, wherein the comparison includes one or more modifications as made by the first member to the template.

31 Claims, 5 Drawing Sheets

HEAD-TO-HEAD COMPARISONS

CROSS REFERENCE TO OTHER APPLICATIONS

This application is a continuation of co-pending U.S. patent application Ser. No. 11/529,871, entitled HEAD-TO-HEAD COMPARISONS filed Sep. 29, 2006 which is incorporated herein by reference for all purposes.

BACKGROUND OF THE INVENTION

In the context of online stores, a user or potential customer of the store typically has for a particular type or class of item multiple different models from which to select. Different models may differ, for example, by available features, prices, manufacturers, etc. In some cases, administrators of an online store may provide comparisons of features and/or prices for different models of the same type of item to aid a user in the selection of a particular item. Such administrator supplied comparisons, however, typically do not include reviews on individual items and/or user feedback on items. A user of an online store may have access to reviews and/or feedback posted by others on individual items, but the user typically would have to expend time reading and sifting through the reviews for each individual item from a set of similar items under consideration to gain a sense of the pros and cons of each item. A single review and/or comparison of different models of the same type of item may exist from third parties (e.g., other web sites, magazine articles, etc.). However, a user or potential customer of the online store would have to locate such a review and/or comparison externally from the online store. It would be useful for a user of an online store to have access within an online store to side-by-side comparisons and reviews on a plurality of items of the same type. In addition, when making a decision on which item to select, e.g., for purchase, it might be useful to the user to receive, from someone who has knowledge and/or expertise on the type of item and who is not an employee or affiliate of the online store who may have an interest in selling an item and possibly not the best interests of the user in consideration, a recommendation on the best item in a set of similar items available at the online store.

BRIEF DESCRIPTION OF THE DRAWINGS

Various embodiments of the invention are disclosed in the following detailed description and the accompanying drawings.

DETAILED DESCRIPTION

Figure 1:
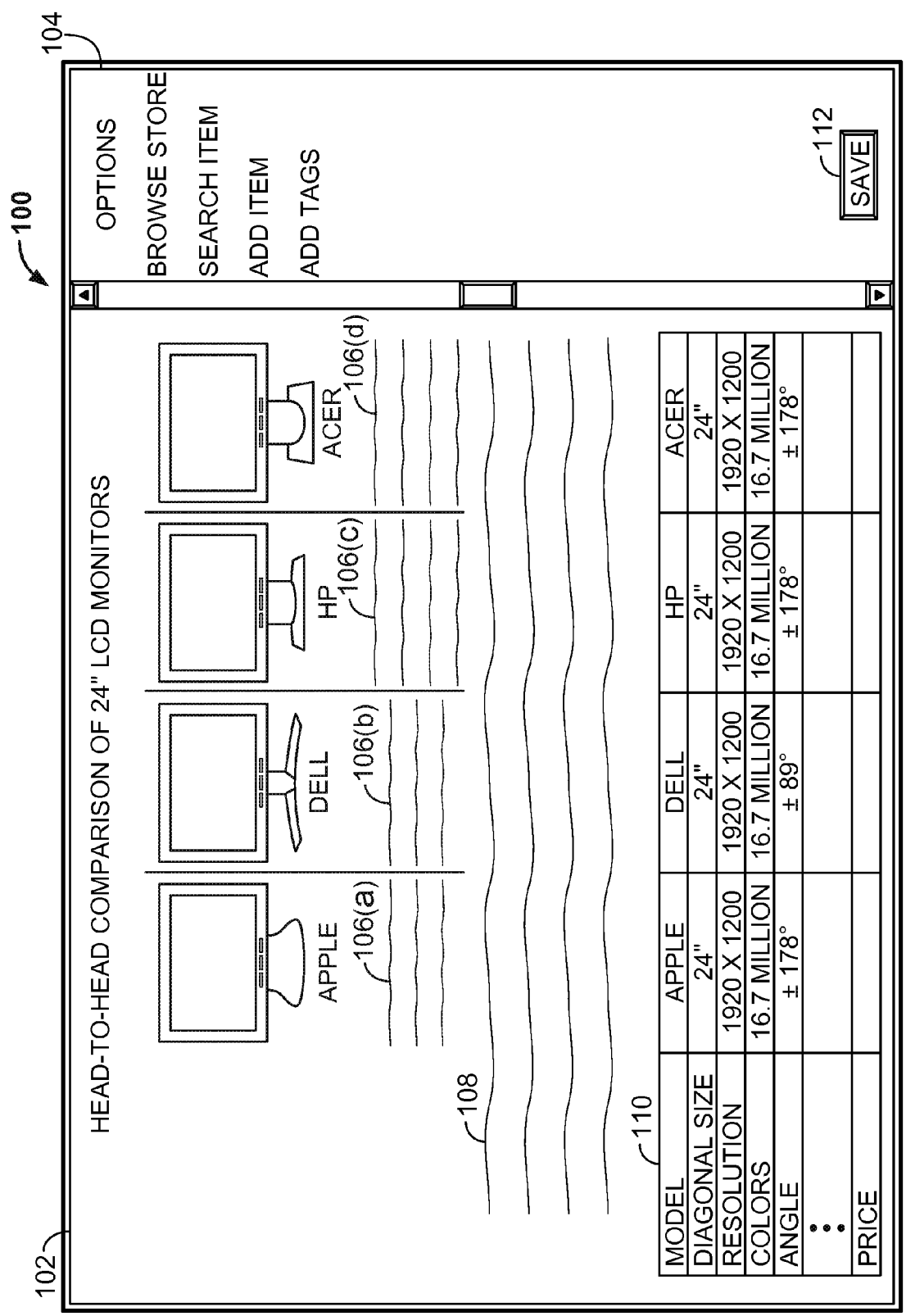
FIG. 1 illustrates an embodiment of an interface used to create a head-to-head comparison.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing a comparison of a set of similar items is disclosed. In some embodiments, a selection of a set of similar items to be included in a comparison is received from a first member of an online community, and the comparison is stored so that the comparison can be presented to a second member of the online community when an indication is received that the comparison is of interest to the second member.

In some embodiments, a "head-to-head comparison" includes a comparison and/or review of a plurality of similar items or products. Such a head-to-head comparison may be useful, for example, to someone interested in purchasing a particular type of item but uncertain about which specific product to purchase. A head-to-head comparison can aid in making a decision about which item in a set of like items is the best or the best for a particular purpose or value.

Allowing members of a relevant community, e.g., an online community (such as users of an online store), to create or define head-to-head comparisons that can be provided to other members of the community, e.g., other users or customers of the store in the case of an online store, when appropriate is disclosed. In many cases, the user community may represent a wealth of information about a set of similar items or products available, for example, from an online store (or other third party), and it would be useful to be able to provide a comparison of the set of similar items to other users.

A user having some knowledge or expertise on a particular type of item may desire to create a head-to-head comparison that includes a plurality of items or products of that type. The author of a head-to-head comparison may include reviews and/or comparisons of various features associated with the items that are included in the head-to-head comparison as well as commentary on how the items differ. In some embodiments, the author may specify pros and cons of the items included in the head-to-head comparison. In some embodiments, the author may rank the items and/or indicate which item the author feels to be the best in the set of items included in the head-to-head comparison. In some such cases, the author may rank the items included in a head-to-head comparison differently based on the intended use of the items and/or may select different items to be the best for different uses or under different circumstances. In some embodiments, the items included in a head-to-head comparison are similarly priced. In some embodiments, a head-to-head comparison includes items that are differently priced, and in some such cases may include reviews that compare prices to features or performance. In some embodiments, similar items from different manufacturers are compared in a head-to-head comparison. In some embodiments, a head-to-head comparison includes multiple items from the same manufacturer. In some embodiments, when an author selects items to be included in a head-to-head comparison, a comparison grid including various features of the items selected is automatically generated and/or populated from product descriptions and/or specifications available at an online store so that the author does not have to supply such information when defining a head-to-head comparison. In some such cases, the author may have the ability to append to, delete from, modify, etc., information included in the automatically generated comparison grid. A head-to-head comparison created by one user of an online store may be useful to other users of the online store who are interested in the items and/or type of items included in the head-to-head comparison and may be presented to such an other user when an indication of interest in the items and/or type of items included in the head-to-head comparison is received.

FIG. 1 illustrates an embodiment of an interface used to create a head-to-head comparison. In some embodiments, a user is provided with a graphical user interface (GUI), such as GUI 100, to create a head-to-head comparison. The example given in FIG. 1 depicts the creation using GUI 100 of a head-to-head comparison 102 of 24-inch LCD monitors. A user having knowledge about such devices may create such a head-to-head comparison and may select a plurality of comparable items (e.g., in price, size, features, etc.) to include in the head-to-head comparison 102. GUI 100 includes various options 104 to aid a user in the creation of a head-to-head comparison 102. For example, a user may have the option to browse through an associated online store to find a desired item and select an item to be included in the head-to-head comparison 102; a user may have the option to search for a desired item and in response to such a search be presented with one or more items matching the search term(s) that can be added to the head-to-head comparison 102 upon selection; a user may have the option to add a desired item to the head-to-head comparison 102, for instance, by identifying the item by name, item number, or other identifier; a user may have the option to add text (e.g., 106 and 108) to be associated with one or more of the items included in the head-to-head comparison 102 or with the head-to-head comparison 102 as a whole; a user may have the option to add tags or keywords to be associated with the head-to-head comparison 102 which can be used to categorize the head-to-head comparison 102 so that it can be retrieved and presented to other users of the online store who express interest in the items and/or type of items included in the head-to-head comparison 102; etc.

In the example of FIG. 1, a user defining head-to-head comparison 102 has selected a set of 24-inch LCD monitors from different manufacturers, included comments 106 for each item as well as comments 108 on the head-to-head comparison 102 as a whole. For example, the user may include via comments 106 and/or 108 information on the various features of the items, information on the expected performance of the items, reviews of the items, information on usage conditions under which one or more of the items functions the best, information on personal experience using one or more of the items, a pick of the best item in the set of items, information on the background and/or expertise of the user to provide credibility to the comparison, and/or any other appropriate information or content that supports the comparison. In some embodiments, when a user selects items to be included in head-to-head comparison 102, a comparison chart 110 including various features associated with the selected items is automatically generated and/or populated from product descriptions and/or specifications available at an online store and included in the head-to-head comparison 102 so that the user defining the head-to-head comparison 102 does not have to supply such information. In some such cases, the user defining head-to-head comparison 102 has the ability to add to, remove from, modify, etc., information included in chart 110 and/or has the option to remove chart 110 completely from head-to-head comparison 102. In some embodiments, the user defining head-to-head comparison 102 specifies or selects keywords or tags to be associated with and categorize the head-to-head comparison 102 that, for example, can be used to retrieve the head-to-head comparison 102 for other users who express interest in a topic or item that matches, is associated with, and/or is related to one or more of such tags. For head-to-head comparison 102 of FIG. 1, for example, tags such as "monitors", "displays", "24-inch LCD", etc., may be selected. Once a user has finished defining a head-to-head comparison, in some embodiments, the user has the option to save 112 the head-to-head comparison 102 in an archive of head-to-head comparisons associated with an online store so that the head-to-head comparison 102 can be provided to users of the online store who express interest in an item or type of item included in head-to-head comparison 102.

FIG. 1 illustrates one example of an interface that can be used by a user of an online store to create a head-to-head comparison. Alternatively, any other appropriate interface configuration and associated options can be employed for the creation of a head-to-head comparison.

Figure 2:
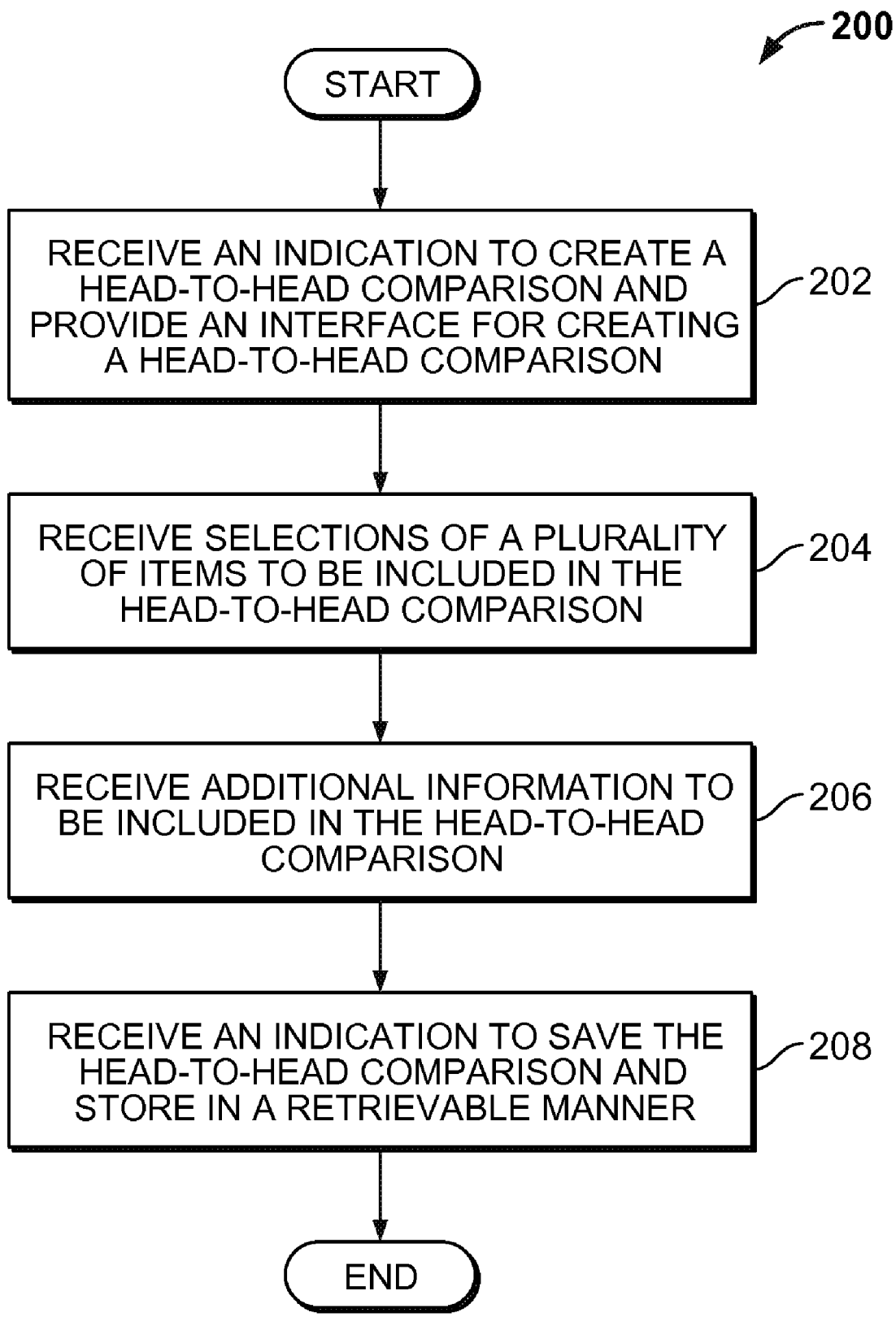
FIG. 2 illustrates an embodiment of a process for creating a head-to-head comparison.

FIG. 2 illustrates an embodiment of a process for creating a head-to-head comparison. In some embodiments, process 200 is employed to create head-to-head comparison 102 of FIG. 1. Process 200 starts at 202 at which an indication to create a head-to-head comparison is received from a user. Such an indication may be received, for example, in response to a selection of an option to create a new head-to-head comparison by a user from an interface associated with an online store with respect to which the head-to-head comparison is being created. Step 202 includes providing an interface for creating a head-to-head comparison to a user in response to receiving an indication to create a head-to-head comparison from the user. In some embodiments, the interface for creating a head-to-head comparison comprises a GUI, such as GUI 100 of FIG. 1. At 204, selections of a plurality of items to be included in the head-to-head comparison are received from the user. In some embodiments, a user is only allowed to select items of the same type or class to be included in the head-to-head comparison. For example, a user may not be allowed to include a keyboard in a head-to-head comparison that includes monitors. At 206, additional information associated with one or more of the items selected at 204 and/or the head-to-head comparison as a whole is received. In some embodiments, the additional information of 206 is at least in part provided by the user creating the head-to-head comparison. The user, for example, may desire to include information on the various features of the items, information on the expected performance of the items, reviews of the items, information on usage conditions under which one or more of the items functions the best, information on personal experience using one or more of the items, a pick of the best item in the set of items, information on the background and/or expertise of the user to provide credibility to the comparison, and/or any other appropriate information or content that supports the comparison. In some embodiments, at 206 a chart including comparisons of the various features of the items selected at 204 is automatically generated and/or populated from product descriptions and/or specifications available at an online store and included in the head-to-head comparison so that the user defining the head-to-head comparison does not have to supply such information, and the user creating the head-to-head comparison may have the option to edit, modify, delete, append to, etc., such information. In various embodiments, the additional information received at 206 may include text or other appropriate multimedia content such as images, photographs, graphics, animations, video, audio, links to other pages or sites, etc. In some embodiments, the additional information received at 206 includes one or more tags or keywords supplied by the user creating the head-to-head comparison that are to be associated with the head-to-head comparison and that can be used to index or categorize the head-to-head comparison for future retrieval. At 208, an indication to save the created head-to-head comparison is received, and the head-to-head comparison is stored in a retrievable manner. Process 200 subsequently ends.

In some embodiments, process 200 is employed to create a new head-to-head comparison from scratch. Alternatively, a head-to-head comparison can be created using an existing head-to-head comparison as a baseline. That is, a user may access and use as a baseline for his/her own head-to-head comparison a head-to-head comparison created by another user and/or other third party. In some embodiments, an existing head-to-head comparison can be modified or updated by the user who created the head-to-head comparison. For example, when a user logs into his/her online store user account, the user may have the option to access one or more head-to-head comparisons created by the user, e.g., to update and/or modify the head-to-head comparison. In some embodiments, the prices included in an automatically generated chart of features of the items included in a head-to-head comparison may be automatically updated when changes to one or more of the prices occur. A head-to-head comparison may be created, such as using process 200, by any internal or external user of an online store, such as an employee, administrator, shopper, user browsing through the online store, etc. Once a head-to-head comparison has been created, it can be presented to any user of the online store who expresses interest in a topic associated with the head-to-head comparison and/or one or more of the items or types of items associated with the head-to-head comparison. In some embodiments, a user can externally link to a head-to-head comparison, for example, on a blog or personal web site, and/or include a link to a head-to-head comparison in an email or other type of electronic message.

Figure 3:
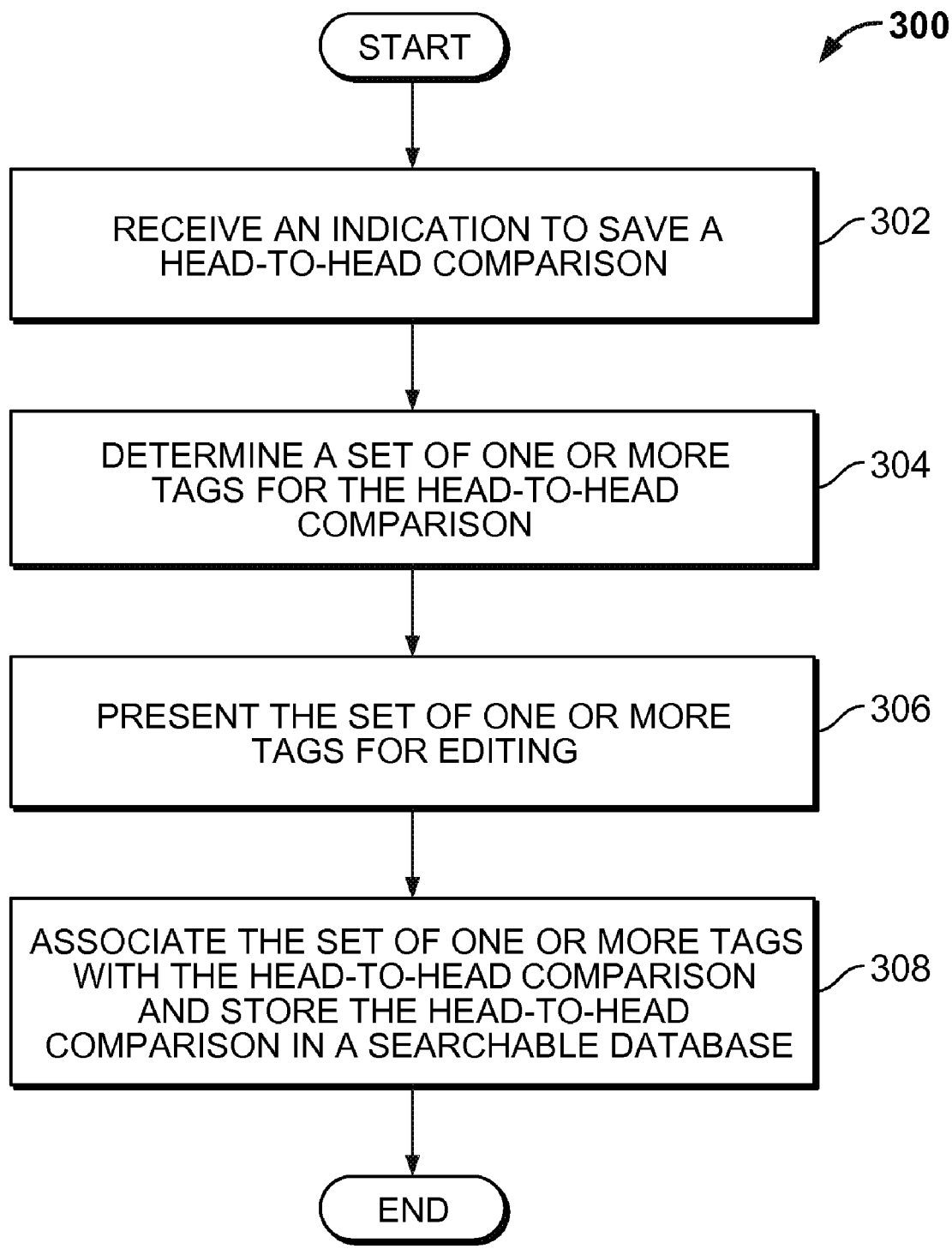
FIG. 3 illustrates an embodiment of a process for storing a head-to-head comparison.

FIG. 3 illustrates an embodiment of a process for storing a head-to-head comparison. In some embodiments, process 300 is employed at 208 of process 200 of FIG. 2. Process 300 starts at 302 at which an indication to save a head-to-head comparison is received. At 304, a set of one or more tags or keywords are determined for the head-to-head comparison. In some embodiments, the user creating the head-to-head comparison supplies one or more tags for the head-to-head comparison, such as at 206 of process 200 of FIG. 2. In some embodiments, the user creating the head-to-head comparison is prompted for tags at 304. In some embodiments, the content of the head-to-head comparison is parsed to automatically extract one or more applicable tags. In some embodiments, one or more tags associated with the items included in the head-to-head comparison are included in the set of tags to be associated with the head-to-head comparison. At 306, the set of one or more tags determined at 304 are presented to the user creating the head-to-head comparison for editing. The user may select all or a subset of the presented tags, may modify one or more of the tags, may add to the set of presented tags, etc., for example, based on the relevance of the various tags to the topic associated with and/or items or type of items included in the head-to-head comparison. In some embodiments, step 306 is optional. In some embodiments, the user is not provided with the set of tags to be associated with the head-to-head comparison for editing, unless, for example, an indication is expressly received from the user to edit the set of tags to be associated with the head-to-head comparison. At 308, the set of tags determined at 304 and/or selected by the user creating the head-to-head comparison at 306 are associated with the head-to-head comparison (e.g., in metadata associated with the head-to-head comparison), and the head-to-head comparison is stored in a searchable database. Process 300 subsequently ends.

Figure 4:
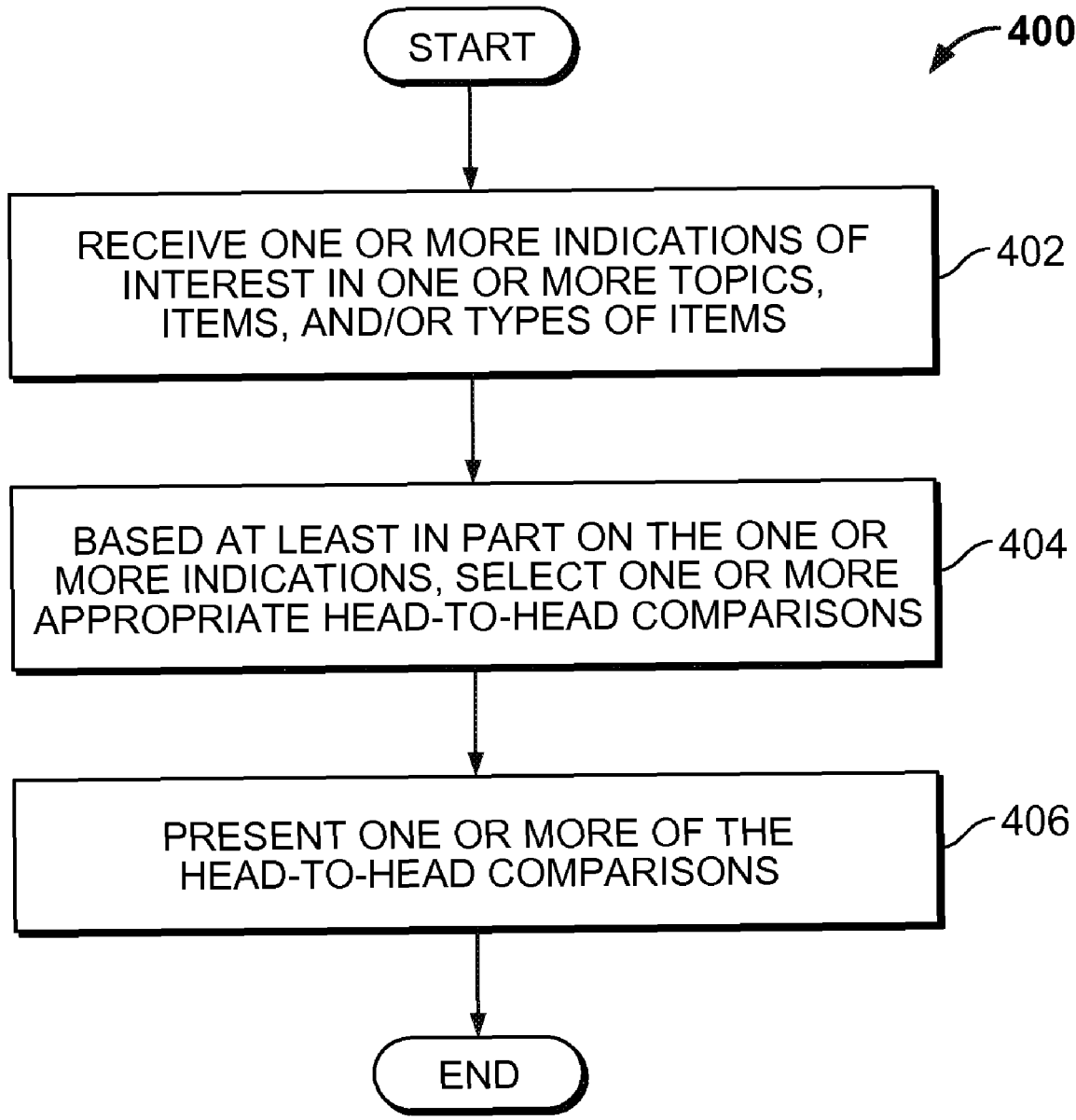
FIG. 4 illustrates an embodiment of a process for providing one or more head-to-head comparisons to a user of an online store.

FIG. 4 illustrates an embodiment of a process for providing one or more head-to-head comparisons to a user of an online store. In some embodiments, a head-to-head comparison is presented to a user when the user expresses interest in a topic associated with, items or types of items included in, and/or tags associated with the head-to-head comparison. Process 400 begins at 402 at which one or more indications of interest in one or more topics, items, and/or types of items are received, for example, from current and/or past activity of a user within the online store. Such indications of interest may be received at 402, for example, when the user views, browses, and/or navigates to particular pages (e.g., product detail pages) or category pages (i.e. pages associated with particular topics) of the online store; when the user searches for one or more items using associated keywords; when the user expresses an intention to purchase one or more items or types of items, for example, by adding items to his/her online cart; when the user expresses interest in other content associated with the online store; etc. In some embodiments, one or more tags associated with items or content (e.g., particular pages, other head-to-head comparisons, etc.) and/or keywords used to search for items that a user is interested in are used to identify the items or types of items that are of interest to the user and to find relevant head-to-head comparisons for the user, e.g., head-to-head comparisons that have the same or similar tags or keywords. In some embodiments, in addition to and/or instead of receiving one or more indications of interest at 402, past browsing and/or purchasing history of the user are considered to determine the user's interests. At 404, based upon the one or more indications received at 402 of the topics, items, and/or types of items currently of interest to the user and/or based upon the past interests of the user, one or more appropriate head-to-head comparisons are selected, e.g., from an archive or database of head-to-head comparisons available at the online store. At 406, one or more of the head-to-head comparisons determined at 404 are presented to the user for consideration. In some embodiments, when a head-to-head comparison is presented to a user, such as at 406, it is rendered with an associated interface that provides the user with one or more appropriate options, such as options to buy items included in the head-to-head comparison, an option to vote for an item included in the head-to-head comparison, an option to vote for the head-to-head comparison, options to review the items included in the head-to-head comparison and/or to review the head-to-head comparison, options to view reviews of items included in the head-to-head comparison and/or reviews of the head-to-head comparison by others, options to view, vote for, and/or edit tags associated with the head-to-head comparison, etc. Process 400 subsequently ends.

As described above with respect to process 400, head-to-head comparisons may be surfaced for users of an online store in various manners depending on a user's current and/or past activity with respect to the online store. For example, consider a user interested in monitors. When an indication is received that the user is interested in monitors (e.g., because the user has navigated to a page associated with monitors, because the user has searched for terms related to monitors, because the user has expressed interest in other items related to monitors and/or with which monitors can be used, because the user has expressed interest in content associated with monitors, because the user has added a monitor or an item related to a monitor or with which a monitor can be used to the user's online cart, because the user has been interested in monitors in the past, for example, based on the user's past purchase history or browsing history, etc.), one or more head-to-head comparisons associated with monitors may be provided to the user for consideration. Presumptions of a user's interests can be derived from multiple such indications so that possibly more pertinent head-to-head comparisons can be provided to the user. For example, if a user has searched for "monitors" and has viewed and/or purchased products from Apple in the past, one or more head-to-head comparisons that include monitors from Apple (such as head-to-head comparison 102 of FIG. 1) may be presented to the user for consideration. Thus, in some embodiments, head-to-head comparisons are presented to a user based upon all or a subset of information known about a user which may be based upon current and/or past indications of the user's activity with respect to the online store. In some embodiments, additional information known about a user, such as demographic information obtained about the user from when the user registered for a user account with the online store may be employed in the selection of head-to-head comparisons to be provided to the user.

Figure 5:
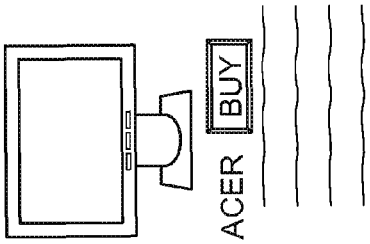
FIG. 5 illustrates an embodiment of a head-to-head comparison provided to a user of an online store.

FIG. 5 illustrates an embodiment of a head-to-head comparison provided to a user of an online store. In some embodiments, head-to-head comparison 500 is provided at 406 of process 400 of FIG. 4. A user presented with a head-to-head comparison 500 can view images of the items included in the head-to-head comparison 500, read the commentary or other information provided by the creator of head-to-head comparison 500, and/or view information of various features of the items included in head-to-head comparison 500 in chart 502, if such a chart is included in a head-to-head comparison. In some embodiments, a head-to-head comparison 500 comprises an interface through which a user can interact. In the given example, for instance, a user presented with head-to-head comparison 500 can choose to purchase an item included in head-to-head comparison 500 via an associated "BUY" button. In some embodiments as depicted in the given example, a user presented with a head-to-head comparison 500 has the option to vote 504 for a best item included in head-to-head comparison 500 and/or view the distribution of votes by users across all items included in head-to-head comparison 500. Although not illustrated in FIG. 5, a user may have the option to view reviews from others users of the head-to-head comparison 500 and/or of the items included in head-to-head comparison 500, and/or the user may have the option to provide a review of the head-to-head comparison 500 and/or one or more of the items included in head-to-head comparison 500.

As depicted in the example of FIG. 5, in some embodiments, a user presented with a head-to-head comparison has the option to vote on the usefulness of the head-to-head comparison so that a usefulness score can be presented with the head-to-head comparison to indicate the popularity of the head-to-head comparison among users of the online store. In the given example, the usefulness score 506 of head-to-head comparison 500 is presented using a five star system, and head-to-head comparison 500 has a usefulness score 506 of four out of five stars. In some embodiments, head-to-head comparisons that are selected to be presented to a user (e.g., at 404 and/or 406 of process 400 of FIG. 4) are filtered based on their usefulness score so that one or more of the most popular head-to-head comparisons are presented to a user for consideration. The usefulness score of a head-to-head comparison is based at least in part on user feedback via voting. In some embodiments, the usefulness score of a head-to-head comparison is based at least in part on the reputation of the author of the head-to-head comparison. For example, statistics about the author's purchase history, such as whether the author has purchased one or more items included in the head-to-head comparison, may be employed in the determination of the usefulness score of the head-to-head comparison. Other statistics about the author such as the number of head-to-head comparisons created by the author, the average usefulness score of the head-to-head comparisons created by the author, how often the author purchases items included in the head-to-head comparisons created by the author, etc., may be tracked and employed in the computation of the usefulness score of a particular head-to-head comparison. For instance, if two potential head-to-head comparisons that can be provided to a user (such as determined at 404 of process 400 of FIG. 4) have the same usefulness score based on feedback via voting and only one of the two head-to-head comparisons is to be provided to the user (such as at 406 of process 400 of FIG. 4), known statistics about the authors of the head-to-head comparisons may be used to further weight the head-to-head comparisons and select the head-to-head comparison to be provided. In some embodiments, the usefulness score associated with a head-to-head comparison is stored with the head-to-head comparison. In some embodiments, the usefulness score of a head-to-head comparison is periodically updated. In some embodiments, the usefulness score associated with a head-to-head comparison is dynamically updated whenever a user votes on the usefulness of the head-to-head comparison. Although a five star rating system has been illustrated in the example of FIG. 5, any other appropriate manner to present a usefulness score, such as providing the percentage of users who found a head-to-head comparison to be useful, may be provided with a head-to-head comparison in various embodiments.

In some embodiments, a user can vote on the usefulness of the tags or keywords associated with a head-to-head comparison. In some embodiments, a head-to-head comparison may be selected to be provided to a user (e.g., at 404 of process 400 of FIG. 4) based on one or more of the most popular tags associated with the head-to-head comparison and the extent to which the most popular tags associated with the head-to-head comparison relate to the interests of the user. In some embodiments, a user has the option to add tags or keywords to be associated with a head-to-head comparison. By allowing users of an online store to provide input with respect to tag or keywords, better categorization of head-to-head comparisons associated with an online store may be achieved.

FIG. 5 illustrates one example of a manner in which a head-to-head comparison 500 and associated interface can be provided to a user. Alternatively, any other appropriate configuration can be employed to present a head-to-head comparison 500 and associated interface to a user to aid the user in the selection of one or more items or products, e.g., for purchase.

By including facilities for head-to-head comparisons as described herein, an online store is able to maintain a constantly evolving archive of head-to-head comparisons based upon the needs of the users or customers of the store. Furthermore, such head-to-head comparisons allow similar items or products of an online store to be categorized and grouped by members of the community using the online store. Community driven head-to-head comparisons guide users of an online store towards potential items of interest and highlight features of the items that they should consider when making a decision about which particular item from a set of available similar items to select. Head-to-head comparisons are useful for users of an online store in obtaining potentially unbiased opinions of various items from other users of the store. Head-to-head comparisons are also useful to administrators of an online store. By allowing users of an online store to create head-to-head comparisons and/or vote on items and/or review items included in the head-to-head comparisons, administrators of the online store are able to extract valuable information about the preferences of the community, reasons why certain items are preferred over other similar items, trends in popularities of various items, etc. Such information can be valuable from a business perspective for the online store and/or the manufacturers of the items.

While many of the examples described in detail above involve head-to-head comparisons defined by a user of an online store, the techniques described herein may be applied as well to other contexts in which members of a relevant community, online or otherwise, desire to provide a comparison of a set of similar items to other members of the community. For example, users of a product comparison website, publication, or TV show, etc. and/or customers of a physical store in various embodiments may use various of the techniques described herein to provide head-to-head comparisons of sets of similar items to other users.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for providing a comparison, comprising:
   receiving from a first member of an online community a selection of a stored prior comparison created by another online community member of a set of similar items;
   providing to the first member a template for the comparison, the template being at least partially pre-populated using data from the stored prior comparison created by the other online community member; and
   receiving from the first member a submission of the comparison, wherein the comparison includes one or more modifications as made by the first member to the template.

2. A method as recited in claim 1, wherein at least one of the first member and the other online community member is a user of an online store.

3. A method as recited in claim 1, further comprising storing the submission of the comparison received from the first member.

4. A method as recited in claim 1, further comprising presenting the comparison to a second member of the online community based at least in part on an indication that the comparison is of interest to the second member.

5. A method as recited in claim 4, further comprising receiving from the second member of the online community a received input comprising one or more of a modification to a content of the comparison or an indication of usefulness of the comparison.

6. A method as recited in claim 5, further comprising updating the comparison to reflect the received input, including by modifying the comparison to reflect the modification to the content if the received input comprises a modification to the content and updating displayed content associated with the comparison to reflect the indication of usefulness if the received input includes an indication of usefulness.

7. A method as recited in claim 1, wherein the items included in the set are of the same type.

8. A method as recited in claim 1, wherein receiving from a first member of an online community a selection of a stored prior comparison comprises receiving one or more of the following: a review of the set of similar items, a comparison of the set of similar items, information on features associated with one or more items included in the set of similar items, comments on one or more items included in the set of similar items, a ranking of the set of similar items, and a selection of a best item in the set of similar items.

9. A method as recited in claim 1, wherein providing to the first member a template for the comparison comprises automatically generating the template, wherein the template comprises a chart that includes data on one or more features associated with one or more items included in the set.

10. A method as recited in claim 9, wherein the chart is populated with data from product specifications.

11. A method as recited in claim 9, wherein the chart and associated data are editable by the first member.

12. A method as recited in claim 3, wherein storing the comparison comprises determining one or more tags to be associated with the comparison.

13. A method as recited in claim 12, wherein determining one or more tags to be associated with the comparison comprises one or more of the following: receiving one or more tags from the first member, prompting the first member for one or more tags, parsing the comparison to determine one or more tags, and determining one or more tags associated with one or more items included in the set.

14. A method as recited in claim 1, wherein the comparison is stored in a searchable database.

15. A method as recited in claim 4, wherein the indication is based at least in part on one or more of the following: current activity of the second member with respect to the online community and past activity of the second member with respect to the online community.

16. A method as recited in claim 4, wherein the indication comprises one or more of the following: an indication of interest in a topic associated with the comparison, an indication of interest in a tag associated with the comparison, an indication of interest in an item included in the set, an indication of interest in a class of items to which the items included in the set belong, and an indication of interest in a tag associated with an item included in the set.

17. A method as recited in claim 4, wherein the indication is received in response to one or more of the following: the second member viewing or navigating to a page associated with an item included in the set, the second member viewing or navigating to a page associated with a class of items to which the items included in the set belong, the second member viewing or navigating to a page associated with a topic associated with the comparison, the second member conducting a search using one or more search terms associated with one or more items included in the set, the second member conducting a search using one or more search terms associated with a topic associated with the comparison, the second member conducting a search using one or more search terms associated with a class of items to which the items included in the set belong, the second member adding an item included in the set to an online cart, the second member adding an item included in a class of items to which the items included in the set belong to an online cart, and the second member adding an item similar to an item included in the set to an online cart.

18. A method as recited in claim 4, wherein presenting the comparison to a second member of the online community includes presenting to the second member an option to vote on a usefulness of the comparison.

19. A method as recited in claim 4, further comprising associating a usefulness score with the comparison.

20. A method as recited in claim 19, wherein the second member is part of a set of members to whom the comparison has been presented and wherein the usefulness score is based at least in part on votes by one or more members included in the set of members to whom the comparison has been presented.

21. A method as recited in claim 19, wherein the usefulness score is based at least in part on a reputation of the first member.

22. A method as recited in claim 4, wherein presenting the comparison to a second member of the online community includes presenting to the second member one or more of the following: options to purchase an item from the set, an option to see reviews of the comparison, an option to review the comparison, an option to see reviews of one or more of the items included in the set, an option to review one or more items included in the set, options to vote for one or more tags associated with the comparison, and an option to add one or more tags to the comparison.

23. A method as recited in claim 1, wherein the first member is not an employee of an online store.

24. A system for providing a comparison, comprising:
   a processor configured to:
      receive from a first member of an online community a selection of a stored prior comparison created by another online community member of a set of similar items;
      provide to the first member a template for the comparison, the template being at least partially pre-populated using data from the stored prior comparison created by the other online community member; and
      receive from the first member a submission of the comparison, wherein the comparison includes one or more modifications as made by the first member to the template; and
   a memory coupled to the processor and configured to provide instructions to the processor.

25. A system as recited in claim 24, wherein at least one of the first member and the other online community is a user of an online store.

26. A system as recited in claim 24, wherein the processor is further configured to present the comparison to a second member of the online community based at least in part on an indication that the comparison is of interest to the second member.

27. A system as recited in claim 24, wherein to receive from a first member of an online community a selection of a stored prior comparison comprises to receive one or more of the following: a review of the set of similar items, a comparison of the set of similar items, information on features associated with one or more items included in the set of similar items, comments on one or more items included in the set of similar items, a ranking of the set of similar items, and a selection of a best item in the set of similar items.

28. A system as recited in claim 24, wherein to provide to the first member a template for the comparison comprises to automatically generate a chart that includes data on one or more features associated with one or more items included in the set.

29. A system as recited in claim 26, wherein the indication is based at least in part on one or more of the following: current activity of the second member with respect to the online community and past activity of the second member with respect to the online community.

30. A system as recited in claim 24, wherein the processor is further configured to associate a usefulness score with the comparison.

31. A computer program product for providing a comparison, the computer program product being embodied in a computer readable storage medium and comprising computer instructions for:
   receiving from a first member of an online community a selection of a stored prior comparison created by another online community member of a set of similar items;
   providing to the first member a template for the comparison, the template being at least partially pre-populated using data from the stored prior comparison created by the other online community member; and
   receiving from the first member a submission of the comparison, wherein the comparison includes one or more modifications as made by the first member to the template.

* * * * *